United States Patent
Daly et al.

[11] 3,749,476
[45] July 31, 1973

[54] RESONANT ACOUSTO-OPTICAL DEVICE

[75] Inventors: Richard T. Daly, Huntington; Robert A. Kaplan, South Huntington; Martin G. Cohen, Huntington, all of N.Y.

[73] Assignee: Quantronix Corporation, Smithtown, N.Y.

[22] Filed: Feb. 16, 1972

[21] Appl. No.: 226,884

Related U.S. Application Data

[63] Continuation-in-part of Ser. No. 76,681, Sept. 30, 1970, abandoned.

[52] U.S. Cl. .......................... 350/161, 331/94.5 Q
[51] Int. Cl. ....................................... G02f 1/30
[58] Field of Search ................. 350/161; 331/94.5

[56] References Cited
UNITED STATES PATENTS

| | | |
|---|---|---|
| 2,084,201 | 6/1937 | Karolus ............................. 350/161 |
| 2,155,659 | 4/1939 | Jeffree .............................. 350/161 |
| 2,267,251 | 12/1941 | Okolicsanyi ..................... 350/161 X |
| 3,297,876 | 1/1967 | De Maria........................... 331/94.5 |
| 3,544,805 | 12/1970 | De Maria........................... 331/94.5 |

OTHER PUBLICATIONS

Electronics, "Switch in Time," Vol. 42, No. 11, pp. 52 & 54, May 26, 1969.

*Primary Examiner*—Edward S. Bauer
*Attorney*—Harvey W. Mortimer et al.

[57] ABSTRACT

An acousto-optical device for intermittently transmitting a light beam including a body of photoelastic material shaped to provide resonant paths of different lengths for one or more beams of acoustic waves, each of which is periodically interrupted for predetermined time intervals. The light beam, which is normally scattered by interaction with the acoustic beams, is transmitted through the body of photoelastic material only when the interrupted intervals of all acoustic beams coincide simultaneously with the light beam.

24 Claims, 14 Drawing Figures

INVENTORS
RICHARD T. DALY
ROBERT A. KAPLAN
MARTIN G. COHEN

*Darby + Darby*
ATTORNEYS 3,749,476
SHEET 2 OF 3
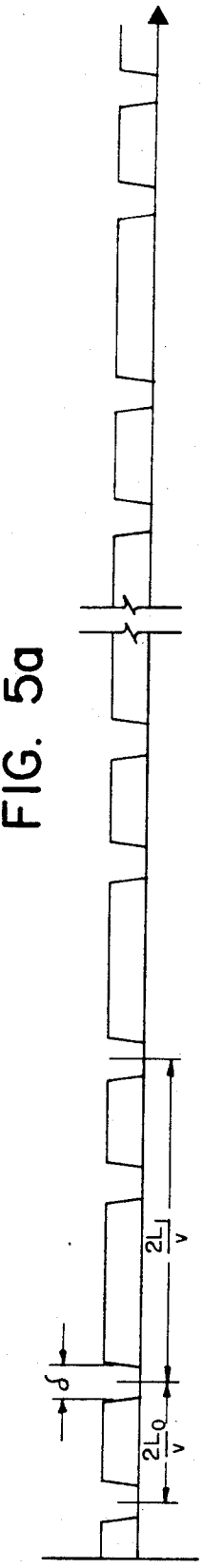
FIG. 5a
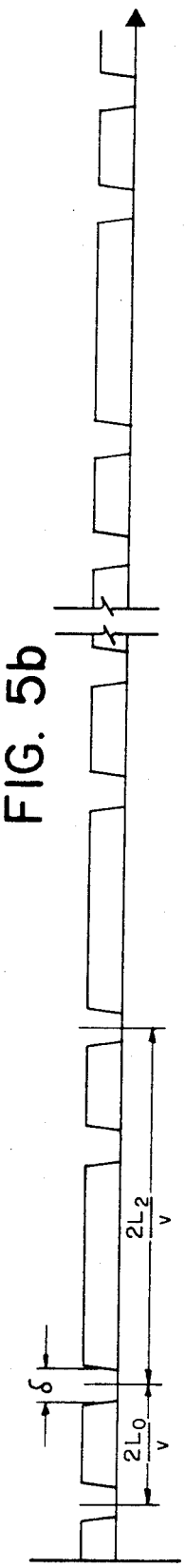
FIG. 5b
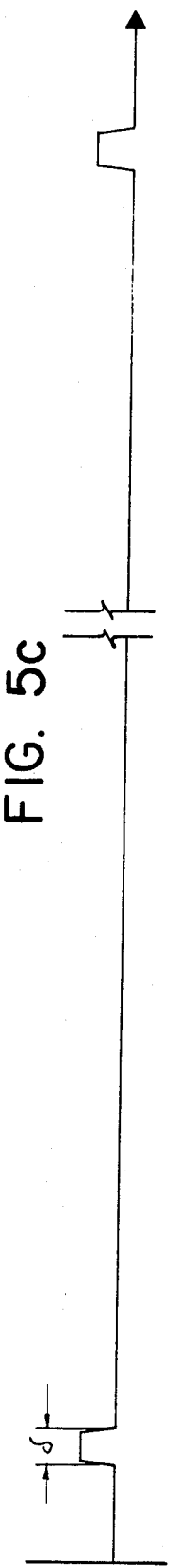
FIG. 5c
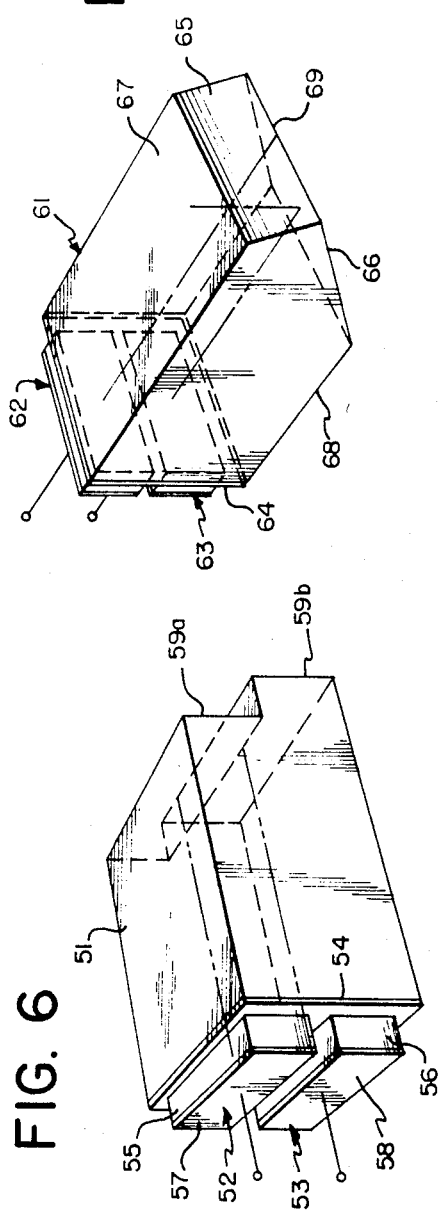
FIG. 6
FIG. 7
INVENTOR.
RICHARD T. DALY
ROBERT A. KAPLAN
MARTIN G. COHEN
BY Darby & Darby
ATTORNEYS

RESONANT ACOUSTO-OPTICAL DEVICE

This application is a continuation-in-part of now abandoned application Ser. No. 76,681 filed Sept. 30, 1970.

The present invention relates generally to acousto-optical devices of the type which utilize the phenomenon of Bragg scattering to control the transmission of a beam of light. More particularly, the present invention relates to an acousto-optical device which utilizes one or more resonant acoustic beams to achieve a more powerful scattering effect coupled with an appropriately synchronized relationship between two or more acoustic beams in order to achieve longer periods of time between the intervals of transmission of the light beam.

One of the important applications of acousto-optical devices has been in the field of laser Q-switching. In a typical acousto-optical laser Q-switch, such as, for example, the Model 301 Q-switch manufactured by the Quantronix Corporation, assignee of the present invention, an ultrasonic transducer is mounted on one end of a block of photoelastic material which is located within the resonant cavity of a laser device. The interaction of the acoustic waves with the laser beam in the block of photoelastic material scatters the laser beam, thereby inhibiting the laser device from reaching its threshold of oscillation. When it is desired to generate a laser output pulse, the acoustic beam is interrupted, or switched off, for a sufficient interval of time to allow the laser oscillations to build up. After the laser pulse is released, the ultrasonic transducer is again activated in order to allow the laser device to accumulate energy for the next succeeding pulse.

In the acousto-optical Q-switches of the prior art, a sheet of acoustic energy absorbing material, such as lead foil, is usually bonded to the end of the block of photoelastic material opposite the transducer in order to absorb acoustic energy and prevent the acoustic waves from being reflected back to the transducer. Additionally, the end of the block of photoelastic material opposite the transducer may be cut, or otherwise shaped, at an angle which is incommensurate with 360° as a further measure to prevent acoustic waves from being reflected back through the zone of interaction with the laser beam. Such reflections are avoided in order to prevent spurious scattering of the laser beam during an interval when the ultrasonic transducer has been switched off for the purpose of releasing a laser pulse.

Because the strength of the scattering effect is proportional to the power of the acoustic waves, the acousto-optical Q-switches of the prior art are limited in their ability to scatter, or quench, a laser beam by the limit of the power handling capability of the ultrasonic transducer which generates the acoustic waves. Hence, the acousto-optical Q-switches of the prior art have not been suitable for use in laser devices wherein a strong quenching effect is required in order to permit high energy levels to be accumulated.

In the prior art, various types of Q-switches, other than acousto-optical Q-switches, have been used to control the laser output pulse in high-powered laser systems. For example, some types of Q-switches which have been used in prior art high powered laser systems include electro-optic Pockel cells in combination with polarizers, and spinning or oscillating prisms or mirrors. However, such devices have very low efficiencies compared with what could be expected from an acousto-optical Q-switch. The quenching effect of an acousto-optical Q-switch can be increased by increasing the length of the zone of interaction between the laser beam and the acoustic waves but, when the zone of interaction is increased, the effective angular range about the nominal Bragg's angle is decreased, with the result that the technique of lengthening the zone of interaction reaches its limit of effectiveness when the range about Bragg's angle becomes less than the angle of divergence of the laser beam. When this occurs, some components of the laser beam may fail to be scattered, and thus the laser oscillation may not be quenched completely.

It is therefore an object of the present invention to provide an acousto-optical device which overcomes the problems of the prior art devices.

More particularly, it is an object of the present invention to provide an acousto-optical device which is capable of producing a strong scattering effect.

It is also an object of this invention to provide an acousto-optical Q-switch which is suitable for use in relatively high energy laser devices.

It is a further object of this invention to provide an acousto-optical device wherein the power level of the acoustic waves in the block of photoelastic material may exceed the maximum power level which is capable of being handled by the ultrasonic transducer.

In accordance with the above objects, the present invention in its simplest form provides a resonant acousto-optical device in which the block of photoelastic material is shaped to provide a resonant path for the acoustic waves generated by the ultrasonic transducer. The length of the resonant path is equal to an integral number of half-wavelengths of the acoustic energy so that acoustic waves generated by the ultrasonic transducer are reflected (with small losses) from the internal surfaces of the block of photoelastic material and are returned to the ultrasonic transducer in phase with the acoustic waves then being generated, thus permitting the acoustic power circulating within the resonant cavity to build up to high levels. As a practical matter, the acoustic power levels which can be achieved through the use of a resonant cavity is on the order of ten times greater than the maximum power level which could be generated by the transducer alone in a non-resonant system.

When disposed within the resonant cavity of a laser device for use as a laser Q-switch, the resonant acousto-optical device of the present invention strongly scatters the laser beam thus spoiling the Q of the laser resonant cavity and preventing the build-up of laser oscillations. Laser output pulses are released by periodically switching off the ultrasonic transducer for short time intervals so as to create gaps or "windows" in the resonant acoustic wave train which allow laser oscillations to build up and a laser output pulse to be released.

It will be appreciated, however, that the maximum time period between the laser output pulses released by this simple resonant acousto-optical Q-switch is equal to the time required for the acoustic waves to traverse the length of the resonant cavity provided within the block of photoelastic material. For resonant acoustic path lengths of convenient size, the time required for the acoustic waves to traverse the length of the resonant acoustic path is too short to allow the energy stored in the laser working medium to build up to high levels.

It is therefore a further object of this invention to provide a resonant acoustic-optical Q-switch suitable for use in laser devices for producing relatively high energy output pulses.

It is also an object of this invention to provide a compact resonant acousto-optical Q-switch which is capable of releasing laser pulses at relatively long time intervals.

According to the above and other objects, the present invention further provides an acousto-optical device including a block of photelastic material which is shaped to provide resonant paths of different lengths for the acoustic waves generated by two or more ultrasonic transducers. Each of the ultrasonic transducers is periodically switched off for short time intervals at periods commensurate with the length of the acoustic path associated with each transducer in order to create "windows" in each acoustic wave train. Each resonant acoustic beam is sufficiently powerful so that it, alone, is capable of quenching laser oscillations. Hence, when the device is disposed within a laser resonant cavity for use as a Q-switch, a laser pulse will be released only at the moment when the "windows" in all of the circulating acoustic wave trains line up with the path of the laser beam. When two or more acoustic beams having different resonant path lengths are employed, the time between the release of laser pulses is proportional to the product of the time periods for each of the individual resonant acoustic beams divided by the time interval during which the acoustic beams are switched off.

The present invention also provides a modified form of acousto-optical device having paths for at least one resonant acoustic beam and at least one non-resonant acoustic beam. In order to block the release of laser pulses the non-resonant acoustic beam is switched on during the periodic short intervals of time when the resonant acoustic beam is switched off. To release a laser pulse, the non-resonant acoustic beam is simply held off during an interval when the resonant acoustic beam is switched off thus providing an open "window" for the laser pulse. The low duty cycle of the non-resonant beam permits acoustic pulses of high power to be employed without overloading the ultrasonic transducer.

An advantage of the resonant acousto-optical Q-switch of the present invention is that, when multiple acoustic beams having different resonant path lengths are employed, the laser pulse frequency may be changed simply by changing the number of gaps or "windows" in one or more of the circulating acoustic wave trains. For example, the laser pulse frequency might be doubled or tripled simply by doubling or tripling the number of windows in a single circulating acoustic wave train.

Another advantage of the acousto-optical Q-switch of the present invention, is that when a resonant acoustic beam and a non-resonant acoustic beam are used in combination, the laser pulse rate may be instantly varied by appropriate control of the non-resonant beam.

Other objects and advantages of the present invention will be apparent to those skilled in the art from the following detailed description and accompanying accompanying drawings which set forth, by way of example, the principle of the present invention and the best mode contemplated for carrying out that principle.

In the drawings:

FIG. 5a is a graph of the signal applied to one of the ultrasonic transducers of the acousto-optical device of FIG. 4 shown as a function of time.

FIG. 5b is a graph of the signal applied to the other ultrasonic transducer of the acousto-optical device of FIG. 4, shown as a function of time.

FIG. 5c is a graph of the occurrence of "windows" in an acousto-optical device of the type shown in FIG. 4 when the transducers are driven by the signals shown in FIGS. 5a and 5b.

FIG. 6 is a perspective view of one form of acousto-optical device having two resonant paths of different lengths according to the present invention.

FIG. 7 is a perspective view of an alternative form of acousto-optical device having two resonant paths of different lengths according to the present invention.

Figure 1:
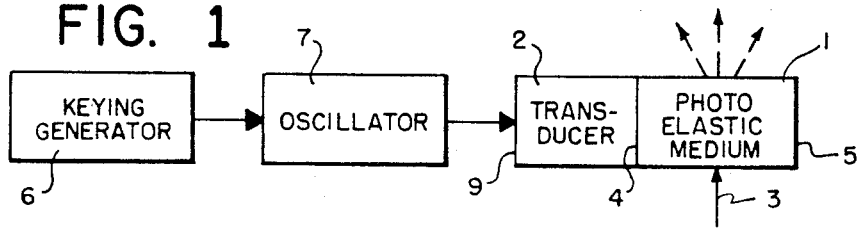
FIG. 1 is a block diagram of a resonant acousto-optical device according to the present invention.

The resonant acousto-optical device which is illustrated in block diagram form in FIG. 1 includes a block of transparent photoelastic material 1 having an ultrasonic transducer 2 mounted on one surface thereof. The photoelastic material may be any transparent, non-centro symmetric photoelastic material known to those skilled in the art. For example, the photoelastic material may be fused quartz, crystalline quartz, lithium niobate ($LiNbO_3$), lead molybdate ($PbMbO_4$), or any of a number of glasses or transparent plastics, such as acrylic plastic, or even water. The photoelastic material should preferably have a large photoelastic coefficient in order to produce strong scattering with a minimum of acoustic power from the transducer 2. Further, the photoelastic material should be substantially transparent to the incident light beam 3 so as not to absorb any appreciable amount of light energy. For example, if the incident light beam 3 is in the infrared portion of the spectrum such as, for example, the output of a carbon dioxide laser, tellurium or gallium arsenide might be used as the photoelastic material.

The block of photoelastic material 1 is preferably of rectilinear conformation. An ultrasonic transducer 2 is mounted on end 4 of block 1. The outer surface 9 of transducer 2 is parallel to the opposite end surface 5 of block 1 so that the acoustic waves generated by the ultrasonic transducer 2 mounted on end 4 of the block of photoelastic material 1 will be reflected back and forth between end surface 5 and end surface 9 so as to provide a resonant effect.

The ultrasonic transducer 2 which is mounted on end 4 of the block of photoelastic material 1 is preferably a piezo-electric crystal or thin film sandwiched between two electrodes to which are supplied the appropriate drive signal for the device as will be explained in greater detail hereinafter.

The drive signal for the ultrasonic transducer 2 may be conveniently generated by the combination of keying generator 6 and oscillator 7. The oscillator 7 generates a carrier signal, preferably a sinusoid having a frequency in the range of 40 to 100 megahertz, for example. More particularly, the oscillator 7 generates a carrier wave having a frequency $f$ which is given by:

$$f = K(V/2L)$$

where $v$ is the velocity of the ultrasonic waves in the photoelastic material, $L$ is the length of the block of photoelastic material 1 measured between the two parallel end surfaces 5 and 9, and $K$ is a large integer. For practical purposes the length $L$ may be considered to be the length of the block of photoelastic material 1 because the ultrasonic transducer 2 is normally very thin and preferably only one-half wavelength thick so as not to affect the resonant frequency of photoelastic block 1. Thus the frequency of the carrier signal produced by carrier wave generator 6 must be such that the length $L$ of the block of photoelastic material 1 is equal to an integral number of half-wavelengths of the carrier signal. This relationship between the frequency $f$ of the carrier signal and the length $L$ of the block of photoelastic material 1 is required in order that there will be a resonant build-up of the amplitude of the acoustic waves in the block of photoelastic material 1. By proper design of the oscillator 7 and the coupling network between oscillator 7 and transducer 2, the oscillator 7 can be made to lock on to one of the resonant frequencies $f = K(v/2L)$ of the resonant structure comprising block 1 and transducer 2 and continue to drive the transducer at that frequency.

The keying generator 6 generates a keying signal or timing signal which is applied to oscillator 7 in order to periodically switch off the carrier signal for short time intervals so as to create "windows" in the acoustic wave train generated in the block of photoelastic material 1 by the ultrasonic transducer 2. When a "window" in the ultrasonic wave train traveling to the right (from end surface 9 to end surface 5) and a "window" in the reflected ultrasonic wave train traveling to the left (from end surface 5) both coincide with the laser beam 3, the Bragg ang'e scattering of the laser beam 3 stops momentarily, allowing laser oscillations to build up so as to produce a laser output pulse. Hence, it will be appreciated that, in general, the keying generator 6 produces a keying signal which interrupts the carrier signal for a short time interval, δ at least twice during each time period $T$, where $T$ is given by $$T = 2L/v$$

Assuming that the laser beam 3 passes through the center of the block of photoelastic material 1 between the end surfaces 9 and 5, the keying generator 6 will be designed to produce a train of equally spaced-timing pulses, the time interval between successive pulses being equal to $T/2$ which equals $L/v$. The pulse width, δ, is just sufficient to allow the build-up of laser oscillations and the release of a laser output pulse. For example, in the case of an yttrium-aluminum-garnet (YAG) laser device, the pulse width, δ, would be on the order of 3 microseconds.

Figure 2:
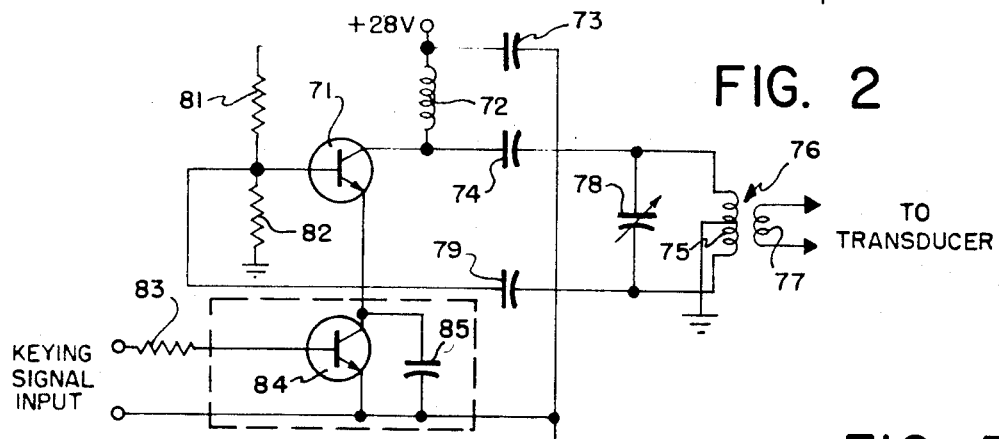
FIG. 2 is a schematic diagram of an oscillator circuit which may be used in the acousto-optical device of FIG. 1.

FIG. 2 is a schematic diagram of an oscillator circuit which is capable of performing the functions of oscillator 7 shown in FIG. 1. The oscillator circuit of FIG. 2 includes a transistor 71 which may be, for example, a 2N3632 transistor. The collector of transistor 71 is connected through an inductor 72 to the +28 volt bias. A capacitor 73 is connected between the +28 volt positive bias and ground. The collector of transistor 71 is also connected through a coupling capacitor 74 to the primary winding 75 of transformer 76. The secondary winding 77 of transformer 76 is connected to the ultrasonic transducer such as transducer 2 shown in FIG. 1. The existence of acoustic waves in the transducer which is a part of the overall resonant structure including the block of photoelastic material 1 shown in FIG. 1 causes changes in the capacitance of the transducer. This varying capacitance is reflected back through transformer 76 and acts as one of the frequency determining elements of the oscillator circuit of FIG. 2. The variable capacitor 78 acts as an auxiliary capacitive frequency determining element. The frequency determining elements including variable capacitor 78, the inductances of the transformer coils 75 and 77 and the variable capacitance of the ultrasonic transducer provide a signal which is fed back through coupling capacitor 79 to the base of transistor 71. Proper biasing of the base of transistor 71 is provided by bias resistors 81 and 82.

The signal supplied to the ultrasonic transducer is keyed on and off by means of the keying signal which is applied through the resistor 83 to the base of transistor 84 which may be, for example, a 2N3632 transistor. The emitter of transistor 84 is grounded, and its collector is connected to the emitter of transistor 71. The collector of transistor 84 is also connected through a capacitor 85 to ground. A negative keying signal applied to the base of transistor 84 will cut off transistor 84 thus cutting off transistor 71 so as to create a "window" in the ultrasonic waves circulating in the block of photoelastic material 1 shown in FIG. 1. A positive signal applied to the base of transistor 84 will cause transistor 84 to conduct which in turn will cause transistor 71 to conduct and thus generate a signal to drive the ultrasonic transducer.

It will be appreciated by those skilled in the art that the oscillator circuit shown in FIG. 2 is a Colpits oscillator in which the characteristics of the load, in this case the capacitance of the ultrasonic transducer, is allowed to determine the operating frequency of the oscillator. This is a condition which is sought to be avoided in most conventional systems including oscillator circuits. However, in the system of the present invention, the ability of the oscillator to pick up one of the resonant frequencies of the combination of the block of photoelastic material 1 and transducer 2 shown in FIG. 1 simplifies the problem of matching the operating frequency of the oscillator to the physical dimensions of the resonant structure. Additionally, the fact that the resonant frequency of the combination of the block of photoelastic material 1 and transducer 2 determine the operating frequency of the oscillator enables the oscillator to "track" the changes in the resonant frequency of the physical structure due to heating effects.

In practice it has been found desirable to adjust the frequency of the keying generator 6 so that the basic keying period is slightly longer than $2L/v$ which is the round trip time for the acoustic waves in the block of photoelastic material 1. This insures that there will be acoustic waves from the block of photoelastic material 1 impinging on the transducer 2 at the moment when the oscillator 7 is keyed on. A fraction of the acoustic energy impinging on the transducer 2 will be converted by the piezoelectric effect to a voltage which is reflected back through the transformer 76 of FIG. 2 so as to cause the oscillator to start up in phase with and lock onto the acoustic waves circulating in the resonant combination of transducer 2 and the block of photoelastic material 1 shown in FIG. 1. When the basic keying period is made slightly longer than $2L/v$, there is a slight rounding off of the edges of the gaps or "windows" in the ultrasonic wave train circulating in the resonant structure.

Figure 3A:
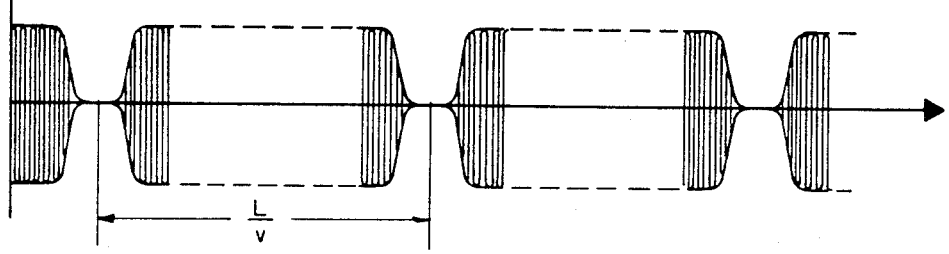
FIG. 3a is a graph showing the signal applied to the ultrasonic transducer of the subject acousto-optical device shown as a function of time.

Referring now to FIG. 3a of the drawings, there is shown a graph of the drive signal applied to the ultrasonic transducer 2 shown as a function of time. The drive signal comprises a radio frequency carrier wave having a frequency $f$ in the range of 40 to 100 megahertz which is periodically switched off or inhibited for short intervals, typically 3 microseconds at periods given by $L/v$.

Figure 3B:
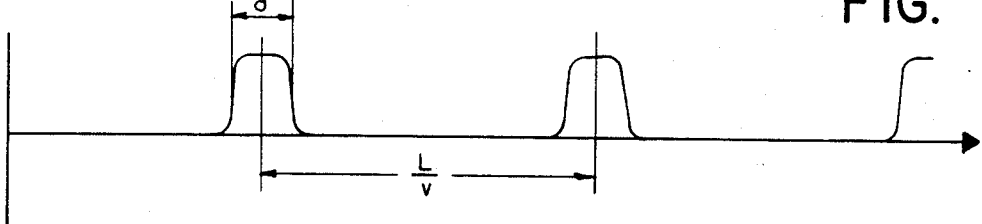
FIG. 3b is a graph of the occurrence of the "windows" in the resonant acoustic beam of the subject acousto-optical device.

FIG. 3b is a graph of the timing of the laser output pulses shown on the same time base as the drive signal of FIG. 3a. It will be seen that the laser output pulses are released when the "windows" in the acoustic wave train coincide in the center of the block of photoelastic material 1 between the two end surfaces 4 and 5. The time period between laser output pulses is given by $L/v$.

Assuming that the block of photoelastic material 1 is of a convenient length, such as, for example, 5–10 cm, and that the velocity $v$ of the acoustic waves is equal to $3.8 \times 10^5$ cm/sec, which is the velocity of shear waves in fused quartz, it will be seen that the frequency of the laser output pulses shown in FIG. 3b is on the order of 40 to 80 kilohertz which is inconveniently high in that it does not allow sufficient time for energy to be accumulated within the laser working medium in order to produce high energy laser output pulses. One solution to this problem might be to increase the length of the resonant path of the acoustic waves. This could be accomplished by greatly increasing the length of the block of photoelastic material 1 shown in FIG. 1, or by using a block of photoelastic material having appropriately angled surfaces in order to fold the resonant path into a more compact space. It will be appreciated, however, that both of these techniques have certain disadvantages. A very long block of photoelastic material could not be conveniently packaged in a laser system, and devices having folded resonant paths are subject to losses of energy at each reflecting surface resulting in a substantial cumulative loss.

The present invention contemplates a resonant acousto-optical Q-switch employing yet another technique for providing a greater time interval between successive laser output pulses. More particularly, referring to FIG. 4 of the drawings, there is shown a block diagram of a resonant acousto-optical Q-switch including a block of transparent photoelastic material having a pair of ultrasonic transducers 12 and 13 mounted on end 14 of the block of photoelastic material 11. The opposite end 15a, b of the block of photoelastic material 11 is shaped to provide resonant paths of different lengths associated with each of the transducers 12 and 13. More particularly, the end surface portion 15a is parallel to and spaced apart from the end surface 12a of transducer 12 by a distance $L_1$ so as to form a resonant cavity for the acoustic waves generated by the transducer 12. The end surface portion 15b is parallel to and spaced apart from the end surface 13a of transducer 13 by a distance $L_2$ so as to form a resonant cavity for the acoustic waves generated by the transducer 13. It will be appreciated that, although the resonant acousto-optical Q-switch of FIG. 4 includes a unitary block of photoelastic material which is shaped to provide two resonant paths of different lengths, separate blocks of photoelastic material might be employed, if desired.

Figure 4:
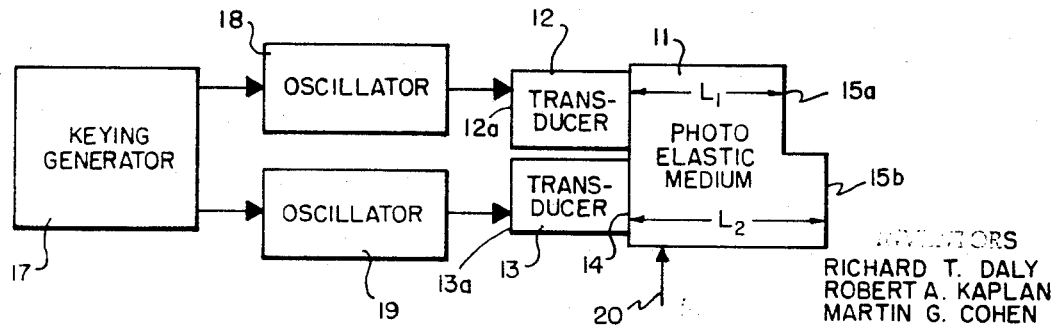
FIG. 4 is a block diagram of a modified form of the resonant acousto-optical device of the present invention including a pair of ultrasonic transducers, each associated with a resonant path of a different length.

The drive signals for ultrasonic transducers 12 and 13 shown in FIG. 4 are provided by oscillators 18 and 19 and keying generator 17. The two separate oscillators 18 and 19 permit practical tolerances in the respective lengths of the two resonant paths of block 11. Oscillators 18 and 19, which may be of the type shown in FIG. 2, generate radio frequency signals having a frequency, $f$, in the range of 40 to 100 megahertz. The keying generator 17 produces two trains of keying pulses. One train of keying pulses controls the oscillator 18 which drives ultrasonic transducer 12, and the other train of keying pulses controls oscillator 19 which drives ultrasonic transducer 13.

FIG. 5a is a graph of a drive signal which might be applied to the transducer 12 shown in FIG. 4. FIG. 5b is a graph of a drive signal that might be applied to the transducer 13 shown in FIG. 4. It will be appreciated that FIGS. 5a and 5b represent the envelope values of the drive signals applied to the transducers 12 and 13 of FIG. 4.

It is noted that both the drive signal of FIG. 5a and the drive signal of 5b are switched off or inhibited for pairs of short intervals. Each short interval has a duration, $\delta$, which corresponds to the time required for the laser oscillations to build up so as to produce a laser output pulse. The two short intervals, $\delta$, of each pair are separated by a time which is equal to or preferably slightly greater than $2L_0/v$ where $v$ is the velocity of the acoustic waves in the block of photoelastic material 11 shown in FIG. 4, and $L_0$ is the distance between the end surface 14 on which the transducers 12 and 13 are mounted and the path of the laser beam 20 through the block of photoelastic material 11. This feature of the drive signals shown in FIGS. 5a and 5b provide that the "windows" in the acoustic wave trains will coincide with the laser beam 20 at a distance $L_0$ from the end surfaces 12a and 15a of transducers 12 and 13 shown in FIG. 4.

It is further noted that, in the drive signal shown in FIG. 5a, each pair of intervals, $\delta$, is separated by a timed period $2L_1/v$ where $L_1$ is the distance between the end surface portion 15a and end surface 14 of the block of photoelastic material 11 shown in FIG. 4. In the drive signal of FIG. 5b, each pair of intervals $\delta$ is separated by a time period $2L_2/v$ where $L_2$ is the distance between the end surface portion 15b and the end surface 14 of block 11. This feature of the drive signals of FIGS. 5a and 5b provides that the acoustic waves generated by the ultrasonic transducers 12 and 13 will be synchronized with the acoustic waves reflecting back and forth in the resonant cavities associated with each of the transducers. The lengths $L_1$ and $L_2$ of the two resonant cavities are each equal to an integral number of half-wavelengths of the respective carrier signals generated by the oscillators 18 and 19 shown in FIG. 4. Further, the lengths $2L_1$ and $2L_2$ of the two resonant cavities must differ by at least $v\delta$ so that the "windows" circulating in one resonant cavity will precess with respect to the "windows" circulating in the other resonant cavity by an amount equal to $v\delta$ or more, and thus avoid an undesirable partial coincidence of the two sets of "windows" with the path of the laser beam 20. Full coincidence of the two sets of "windows" is required in order to release a full laser output pulse.

Referring to FIGS. 5a and 5b, it is seen that the period $2L_2/v$ of the drive signal shown in FIG. 5b exceeds the period $2L_1/v$ of the drive signal shown in FIG. 5a by an amount equal to $\delta$. More particularly, it will be seen that $2L_2/v$ equals approximately $9\delta$, while $2L_1/v$ equals approximately $8\delta$. Further, inspection of FIGS. 5a and 5b reveals that the intervals $\delta$, during which the drive signal of FIG. 5a is inhibited, precess with respect to the intervals $\delta$ during which the drive signal of FIG. 5b is inhibited. More particularly, it is seen that nine full cycles of the drive signal of FIG. 5a and eight full cycles of the drive signal of FIG. 5b elapse between the coincidence of the pairs of intervals $\delta$ at the left end of FIGS. 5a and 5b and the coincidence of the pairs of intervals $\delta$ at the right end of FIGS. 5a and 5b.

Similarly, referring to FIG. 5c, which represents the laser output pulses produced by the acousto-optical Q-switch of FIG. 4 when driven by the signals shown in FIGS. 5a and 5b, it is seen that laser output pulses are released when the pairs of intervals $\delta$ coincide. Consequently, the laser output pulses are separated by a time interval equal to the time interval between the coincidences between the pairs of intervals $\delta$ during which the drive signals of FIGS. 5a and 5b are inhibited.

Generally, the time $T_2$ between the release of laser output pulses by an acousto-optical Q-switch of the type having two resonant cavities of different lengths $L_1$ and $L_2$ as shown in FIG. 4 is given by:

$$T_2 = 2L_1/v \times 2L_2/v \times 1/\delta = 4L_1L_2/v^2\delta = (4L_1L_2)/(v\delta)^2 \times \delta/M$$

where $M$ is the largest common divisor of $L_1/\delta$ and $L_2/\delta$. If a third resonant cavity having a length $L_3$ is added, the time $T_3$ between the release of the laser pulses is given by:

$$T_3 = 2L_3/v \times T_2/\delta = (8L_1L_2L_3)/(v\delta)^3 \times \delta/M$$

and so forth.

While the ratio of the lengths of the resonant cavities in the illustrative example of the subject acousto-optical Q-switch described in connection with FIGS. 4 and 5 is a 8 : 9, it will be appreciated by those skilled in the art that other ratios of lengths may be advantageously employed within the spirit and scope of the present invention. Moreover, it will be appreciated by those skilled in the art that, given resonant cavities of fixed length, the frequency of the laser output pulses can be doubled, tripled or quadrupled, etc. simply by doubling, tripling or quadrupling, etc. the number of "windows" in the acoustic wave train circulating in one or the other or both resonant cavities.

More particularly, it will be seen that the frequency of the laser output pulses may be increased by a factor equal to the product of any factors of the two quantities representing the ratio of the lengths of the two cavities. For example, if the ratio of the lengths of the two resonant cavities is 9 : 10, the frequency of the laser output pulses may be increased by a factor of 2, 3, 5, 6, 9 or 10 by appropriately increasing the number of "windows" circulating in one or both resonant cavities. If the ratio of lengths of the two resonant cavities is 35 : 36, the frequency of the laser output pulses may be increased by a factor of 2, 3, 4, 5, 6, 7, 9, etc. It will be appreciated that all that is necessary in order to increase the frequency of the laser output pulses according to the above technique is to change the timing signals generated by the timing generator 17 shown in FIG. 4. The block of photoelastic material 11 need not be reshaped.

Referring now to FIG. 6 of the drawings, there is shown a perspective view of one form of acousto-optical device having two resonant paths of different lengths. The device of FIG. 6 includes a pair of ultrasonic transducers 52 and 53 mounted on an end surface of the block of photoelastic material 51. The ultrasonic transducers 52 and 53 are preferably in the form of piezoelectric crystals or thin films sandwiched between two electrodes. A common electrode 54 is mounted on the end of the block of photoelastic material 51. The piezoelectric crystals 55 and 56 are mounted on the conductive layer 54, and the electrodes 57 and 58 are mounted respectively on the surfaces of the piezoelectric crystals 55 and 56. The opposite end portions 59a and 59b of the block of photoelastic material 51 are oriented parallel to the end surface carrying electrode 54 so as to form resonant cavities for the acoustic waves generated by the ultrasonic transducers 52 and 53.

FIG. 7 is a perspective view of a modified form of acousto-optical device having two resonant beam paths of different lengths. The acousto-optical device of FIG. 7 includes a pair of ultrasonic transducers 62 and 63 similar to the transducers 52 and 53 shown in FIG. 6. The transducers 62 and 63 are mounted on the end surface 64 of the block of photoelastic material 61. The opposite end of the block 61 includes two surfaces 65 and 66 which are disposed at right angles to each other. Surface 65 is disposed at an angle of 135° to the top surface 67 of the block 61. The surface 66 joins the bottom surface 68 of the block 61 at an angle of 135°. The vertex 69 between the surfaces 65 and 66 is disposed opposite the transducer 62 so as to form a retro-reflector for the acoustic waves generated by the transducer 62. The acoustic waves generated by transducer 63 are reflected upward from end surface 66 to top surface 67, back to end surface 66, and thence back to transducer 63. In this manner, resonant paths of different lengths are provided for the two transducers 62 and 63. It will be appreciated by those skilled in the art that for acoustic waves other than shear waves polarized perpendicular to plane of incidence, there will be partial conversion from shear to compression or vice versa on reflection from surface 66 shown in FIG. 7. Hence, it is preferable to use perpendicular shear waves in the configuration of FIG. 7.

The present invention contemplates another modified form of resonant acousto-optical Q-switch employing still another technique for providing a greater time interval between successive laser output pulses. More particularly, referring to FIG. 8 of the drawings, there is shown a block diagram of a resonant acousto-optical Q-switch including a pair of blocks of transparent photoelastic material 71 and 72 disposed in the path of laser beam 73. Ultrasonic transducers 74 and 75 are mounted on the ends 71a and 72a of photoelastic blocks 71 and 72, respectively, for the purpose of generating the desired acoustic beams. The end 71b of photoelastic block 71 is a reflecting surface and is arranged parallel to and spaced apart from the end surface 71a by a distance $L_1$, for example, so as to form a resonant cavity for the acoustic waves generated by the ultrasonic transducer 74.

An acoustic absorber 76 is mounted on the end surface 72b of photoelastic block 72 so as to absorb the acoustic waves generated by transducer 75 and thus prevent the acoustic waves from being reflected back to transducer 75. For example, a sheet of lead foil, or other energy-absorbing material, may be bonded to the end 72b of photoelastic block 72. In order to effectively dissipate the heat resulting from the absorbed acoustic energy, the absorber 76 should be connected to a heat sink, not shown. In addition, in order to prevent the ultrasonic waves from being reflected back to the transducer 75, the end 72b of photoelastic block 72 may be cut at an angle which is incommensurate with 360°. That is to say that the angle of end 72b should not be an integral sub-multiple of 360°, but some odd angle such as, for example, 53°.

Figure 8:
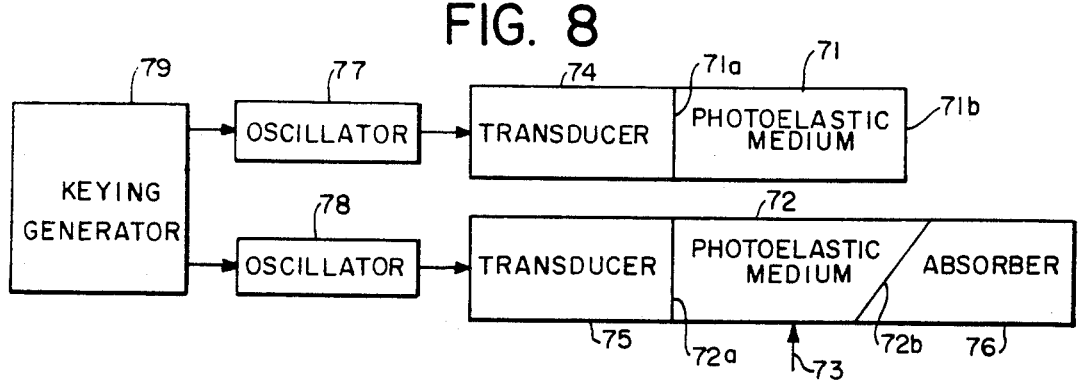
FIG. 8 is a block diagram of another modified form of the acousto-optical device of the present invention including both resonant and non-resonant acoustic beams.

The drive signals for ultrasonic transducers 74 and 75 shown in FIG. 8 are provided by oscillators 77 and 78 and keying generator 79. The oscillators 77 and 78, which may be of the type shown in FIG. 2, generate radio frequency signals having a frequency, $f$, in the range of 40 to 100 megahertz. The keying generator 79 produces two trains of keying pulses. One train of keying pulses controls the oscillator 77 which drives ultrasonic transducer 74, and the other train of keying pulses controls oscillator 78 which drives ultrasonic transducer 75.

Figure 9A:
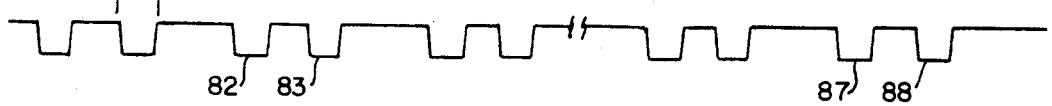
FIG. 9a is a graph of the signal applied to the transducer for the resonant acoustic beam of the acousto-optical device of FIG. 8.
Figure 9B:
FIG. 9b is a graph of the signal applied to the transducer for the non-resonant acoustic beam of the acousto-optical device of FIG. 8.

FIG. 9a is a graph of a drive signal which might be applied to the transducer 74 shown in FIG. 8. FIG. 9b is a graph of a drive signal that might be applied to the transducer 75 shown in FIG. 8. It will be appreciated that, as in the case of FIGS. 5a and 5b, FIGS. 9a and 9b represent the envelope values of the drive signals applied to the transducers 74 and 75.

The drive signal of FIG. 9a is switched off or inhibited for pairs of short intervals, each short interval having a duration, $\delta$, which corresponds to the time required for the laser oscillations to build up so as to produce a laser output pulse. The two short intervals, $\delta$, of each pair are separated by a time approximately equal to $2L_0/v$ which provides that the "windows" in the resonant acoustic beam within photoelastic block 71 will coincide with the laser beam 73 at a distance $L_0$ from the end surface 71a of photoelastic block 71.

The drive signal of FIG. 9b is switched on, or pulsed, for short intervals, $\delta$, which are synchronized with the drive signal of FIG. 9a so that the acoustic pulses generated in photoelastic block 72 coincide with the "windows" in the resonant acoustic beam circulating in photoelastic block 71. Thus, the acoustic pulses in photoelastic block 72 serve to prevent laser oscillations from building up during the "windows" in the resonant acoustic beam circulating in block 71.

Because of the non-resonant character of the acoustic waves generated in photoelastic block 72, the peak acoustic power produced by transducer 75 must be substantially greater than the peak acoustic power produced by transducer 74. As mentioned above, the acoustic power levels which build up in a resonant cavity may be on the order of ten times greater than the acoustic power produced by the transducer. Therefore, it will be apparent that, in order to produce a laser-quenching effect approximately equal to that produced by the resonant acoustic beam in photoelastic block 71, the peak power of the radio frequency carrier wave pulses incident on transducer 75 must be on the order of ten times greater than the peak power of the radio frequency carrier wave incident on transducer 74. However, because of the low duty cycle of the signal incident on transducer 75, the average power incident on transducer 75 is comparable to the average power incident on transducer 74. For example, in a practical application, the acoustic pulses generated by transducer 75 may be on the order of $2\mu\text{sec}$ wide and occur only every $20\mu\text{sec}$.

Figure 9C:
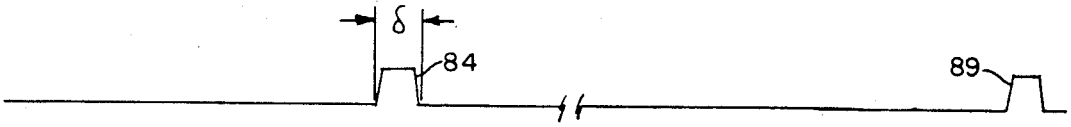
FIG. 9c is a graph of the occurrence of open "windows" in the acousto-optical device of FIG. 8.

To release a laser pulse, the keying in generator 79 operates to hold transducer 75 "off" during one of the "windows" in the resonant acoustic beam circulating in photoelastic block 71. For example, referring to FIG. 9b, transducer 75 of FIG. 8 might be held "off" at time 81, thus allowing a "window" to be formed by switched-off intervals 82 and 83 of the drive signal illustrated in FIG. 9a to open, thus releasing the laser pulse 84 shown in FIG. 9c. Similarly, when the transducer 75 is held "off" at time 86 in FIG. 9b, the switched-off intervals 87 and 88 of FIG. 9a form an open "window" which allows the release of laser pulse 89 of FIG. 9c.

By selectively pulsing or not pulsing transducer 75, the Q-switching rate of the acousto-optical Q-switch of FIG. 8 can be varied from $v/2L_1$ down to 0 by the discrete values $v/2nL_1$, where $L_1$ is the length of photoelastic block 71 and n is any integer. Thus, the acousto-optical Q-switch of FIG. 8 provides an extremely flexible selection of Q-switching rates. Moreover, because of the non-resonant character of the acoustic pulses passing through photoelastic block 72, the Q-switching rate can be changed instantaneously as much as there is no need to wait for resonant acoustic waves to die down prior to establishing a new switching rate.

Although the block diagram of FIG. 8 shows an acousto-optical device including two photoelastic blocks 71 and 72 it will be appreciated that a single photoelastic block appropriately shaped to provide resonant and non-resonant acoustic beam paths may be employed.

It will be apparent to those skilled in the art that other modifications and adaptations of the subject resonant acousto-optical device may be made without departing from the spirit and scope of the present invention as set forth with particularity in the appended claims.

What is claimed is:

1. An acousto-optical device for intermittently transmitting a light beam comprising:
   a body of photoelastic material transparent to the wavelength of the light beam to be transmitted, said body of photoelastic material being shaped so as to provide a resonant cavity for acoustic waves;

means for generating a beam of acoustic waves in said body of photoelastic material at one of the resonant frequencies thereof, the direction of propagation of said beam of acoustic waves being such as to cause Bragg scattering of the light beam; and means for interrupting said beam of acoustic waves for a predetermined interval twice during each time period required for said acoustic waves to traverse said resonant cavity so that corresponding transmitted interruptions meet reflected interruptions to provide gaps in said beam of acoustic waves in order to permit said light beam to be transmitted through said body of photoelastic material when said gaps coincide with said light beam.

2. The acousto-optical device of claim 1, wherein said body of photoelastic material is in the form of a rectilinear solid.

3. The acousto-optical device of claim 2, wherein said means for generating a beam of acoustic waves comprises an electro-mechanical transducer mounted on one end of said rectilinear body of photoelastic material, and a single generator connected to said electro-mechanical transducer for driving said electro-mechanical transducer to generate resonant acoustic waves in said rectilinear body of photoelastic material.

4. The acousto-optical device of claim 3, wherein said electro-mechanical transducer comprises a piezoelectric crystal.

5. The acousto-optical device of claim 3, wherein said electro-mechanical transducer and rectilinear body of photoelastic material act as a frequency determining element of said signal generator.

6. The acousto-optical device of claim 3, wherein said means for interrupting said beam of resonant acoustic waves comprises means for inhibiting the signals from said signal generator to said electro-mechanical transducer, and timing means for operating said inhibiting means twice during each time interval required for said acoustic waves to traverse said resonant cavity.

7. The acousto-optical device of claim 6, wherein said timing means operates said inhibiting means to inhibit the signals from said signal generator to said electro-mechanical transducer twice during a time period $T = 2L/v$ where $v$ is the velocity of the acoustic waves in the body of photoelastic material and $L$ is the length of said resonant cavity.

8. The acousto-optical device of claim 7, wherein said timing means operates said inhibiting means to inhibit the flow of signals from said signal generator to said electromechanical transducer once during each time period $T = L/v$ where $v$ is the velocity of the acoustic waves and $L$ is the length of said resonant cavity.

9. The acousto-optical device of claim 1, wherein said means for interrupting said beam of acoustic waves operates to interrupt said beam of acoustic waves for time intervals commensurate with the rise time of laser oscillations.

10. An acousto-optical device for intermittently transmitting a light beam comprising:

a body of photoelastic material transparent to the wavelength of the light beam to be transmitted, means for generating a first beam of resonant acoustic waves in said body of photoelastic material in a direction such as to cause Bragg scattering of the light beam to be transmitted, said body of photoelastic material being shaped so that said beam of acoustic waves propagated by said first beam generating means are reflected from an interior surface of said body of photoelastic material and are returned to said first beam generating means along a first predetermined path;

means for generating a second beam of resonant acoustic waves in said body of photoelastic material in a direction such as to cause Bragg scattering of the light beam to be transmitted, said body of photo-elastic material being shaped so that said beam of acoustic waves generated by said second beam generating means are reflected from an interior surface of said body of photoelastic material and are returned to said second beam generating means along a second predetermined path, the length of said second predetermined path being different from the length of said first predetermined path;

means for interrupting said first beam of acoustic waves for a predetermined interval twice during each time period required for said acoustic waves to traverse said first predetermined path; and means for interrupting said second beam of acoustic waves for a predetermined interval twice during each time period required for said acoustic waves to traverse said second predetermined path, whereby said light beam is transmitted through said body of photoelastic material when transmitted and reflected interruptions in said first and second acoustic beams coincide with said light beam.

11. The acousto-optical device of claim 10, wherein the difference between the length of said first predetermined path and the length of said second predetermined path is greater than the product of the velocity of the acoustic waves in said body of photoelastic material and the length of said predetermined time interval for which said acoustic waves are interrupted by said interrupting means.

12. The acousto-optical device of claim 10, wherein said first and second means for interrupting said beams of acoustic waves operate to interrupt said beams of acoustic waves for time intervals commensurate with the rise time of laser oscillations.

13. The acousto-optical device of claim 10, wherein said body of photoelastic material is in the form of a rectilinear solid.

14. The acousto-optical device of claim 13, wherein said first and second beam generating means comprise electromechanical transducers mounted on one end of said rectilinear body of photoelastic material, and signal generators connected to said electro-mechanical transducers for driving said electromechanical transducers to generate beams of acoustic waves in said rectilinear body of photoelastic material.

15. The acousto-optical device of claim 14, wherein said electro-mechanical transducers comprise piezoelectric crystals.

16. The acousto-optical device of claim 14, wherein said electro-mechanical transducers and rectilinear bodies of photoelastic material act as frequency determining elements of said signal generators.

17. The acousto-optical device of claim 10, wherein said means for interrupting said first beam of acoustic waves operates to interrupt said first beam of acoustic waves twice during a period $T = 2L_1/v$ where $2L_1$ is the length of said first predetermined path and $v$ is the velocity of acoustic waves in said body of photoelastic material.

18. The acousto-optical device of claim 17, wherein said means for interrupting said second beam of acoustic waves operates to interrupt said second beam of acoustic waves twice during a time period $T = 2L_2/v$ where $2L_2$ is the length of said second predetermined path and $v$ is the velocity of acoustic waves in said body of photoelastic material.

19. The acousto-optical device of claim 18, wherein said means for interrupting said first and second acoustic beams operate to interrupt said first and second acoustic beams for pairs of intervals separated by a time equal to $2L_0/v$ where $L_0$ is the distance from said first and second beam generating means to the path of said light beam and $v$ is the velocity of acoustic waves in said body of photoelastic material.

20. An acousto-optical de3ice for intermittently transmitting a light beam comprising: device
- a body of photoelastic material transparent to the wavelength of the light beam to be transmitted,
- means for generating a first beam of acoustic waves in said body of photoelastic material in a direction such as to cause Bragg scattering of the light beam to be transmitted, said body of photoelastic material being shaped so as to provide a resonant cavity for said first beam of acoustic waves;
- means for periodocally interrupting said beam of acoustic waves for a predetermined interval twice during each time period required for said acoustic waves to traverse said resonant cavity so that corresponding transmitted interruptions meet reflected interruptions at the path of the light beam to be transmitted;
- means for generating acoustic pulses in said body of photoelastic material in a direction such as to cause Bragg scattering of the light beam to be transmitted, said acoustic pulses being synchronized to coincide with sqid interruptions in said acoustic beam at the path of the light beam to be transmitted;
- an acoustic absorber mounted on said body of photoelastic material for absorbing said acoustic pulses; and
- means for selectively suppressing said acoustic pulses to permit transmission of the light beam.

21. The acousto-optical device of claim 20 wherein said acoustic pulse generating means normally generates an acoustic pulse periodically during each time period required for said beam of acoustic waves to traverse said resonant cavity.

22. The acousto-optical device of claim 20 wherein the width of said acoustic pulses is substantially equal to said predetermined intervals of interruption of said acoustic beam.

23. The acousto-optical device of claim 22 wherein said predetermined intervals are commensurate with the rise time of laser oscillations.

24. The acousto-optical device of claim 20 wherein the portion of the surface of said body of photoelastic material in the path of said acoustic pulses is disposed at an angle incommensurate with 360° to the direction of propagation of said acoustic pulses.

* * * * *